F. H. LEINWEBER, DEC'D.
C. H., W. H. AND V. H. LEINWEBER, EXECUTORS.
AIRSHIP.
APPLICATION FILED NOV. 27, 1916. RENEWED APR. 30, 1920.
1,386,713.
Patented Aug. 9, 1921.
7 SHEETS—SHEET 7.
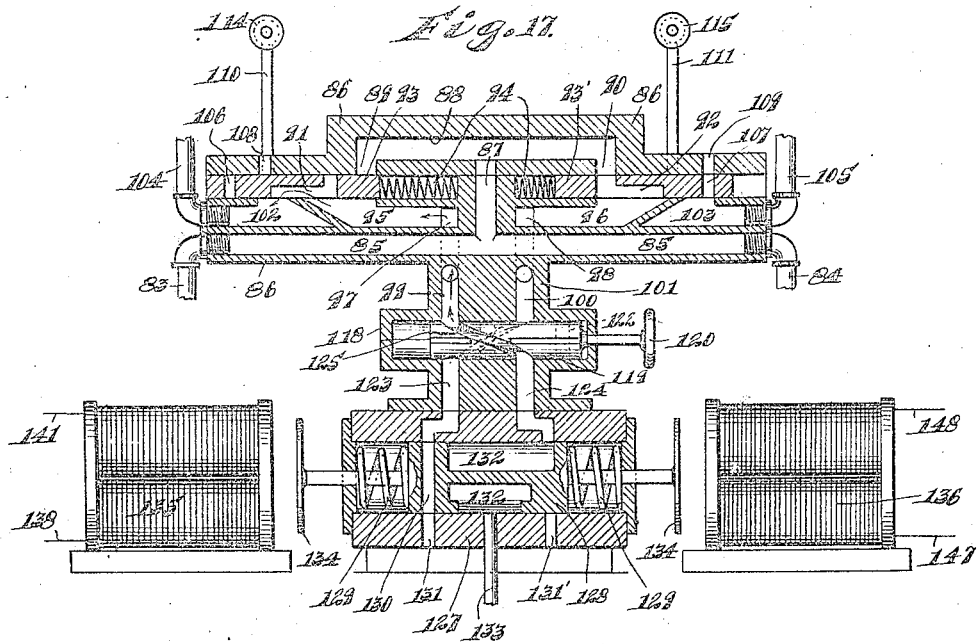
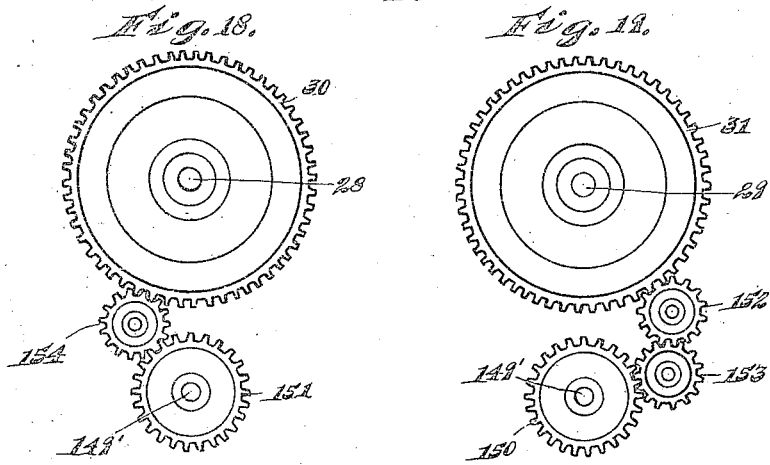
Witnesses:
C. E. Wessels.
B. G. Richards.
Inventor:
Frederick H. Leinweber,
By Joshua R. H. Potts
his Attorney

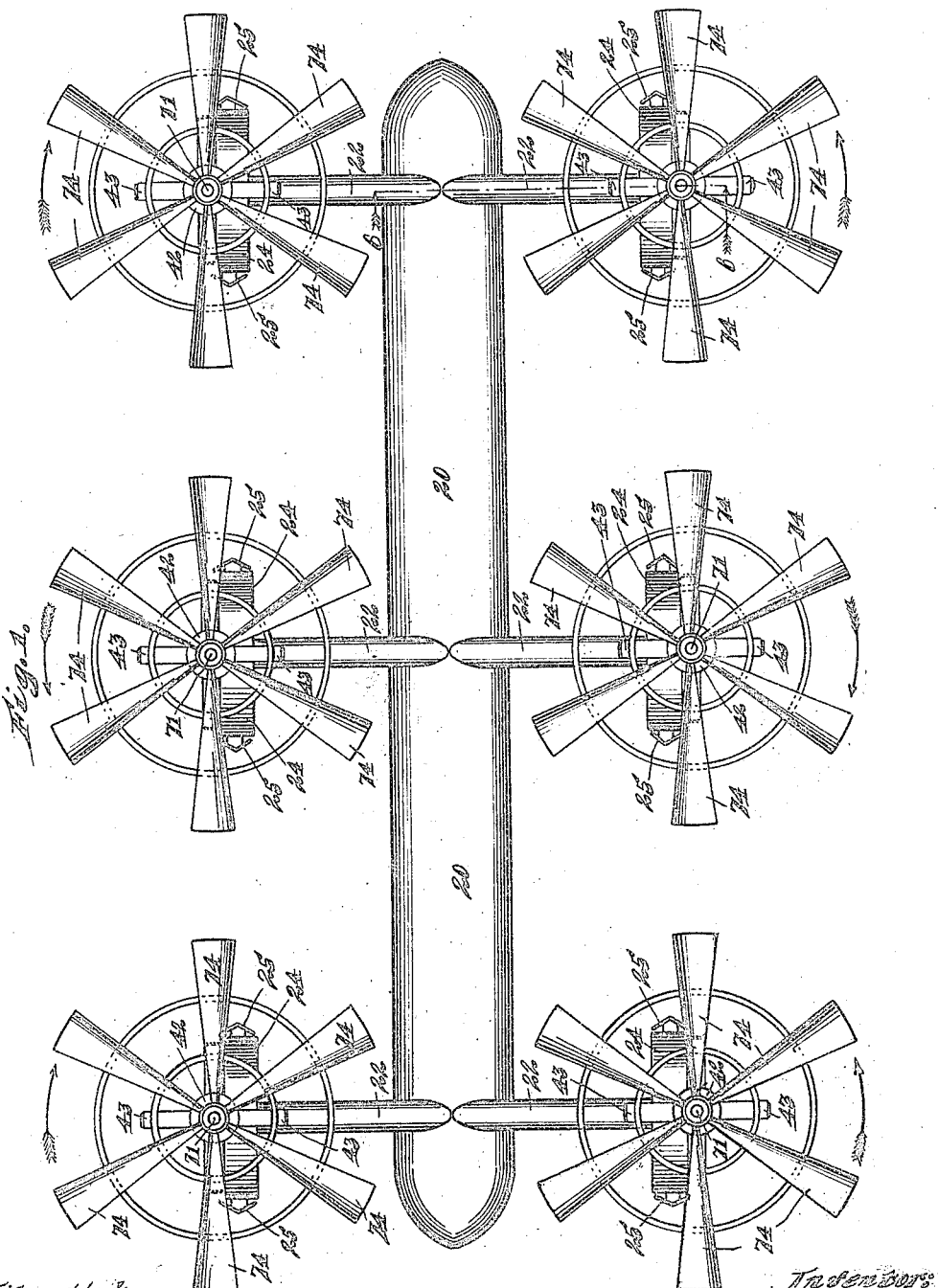

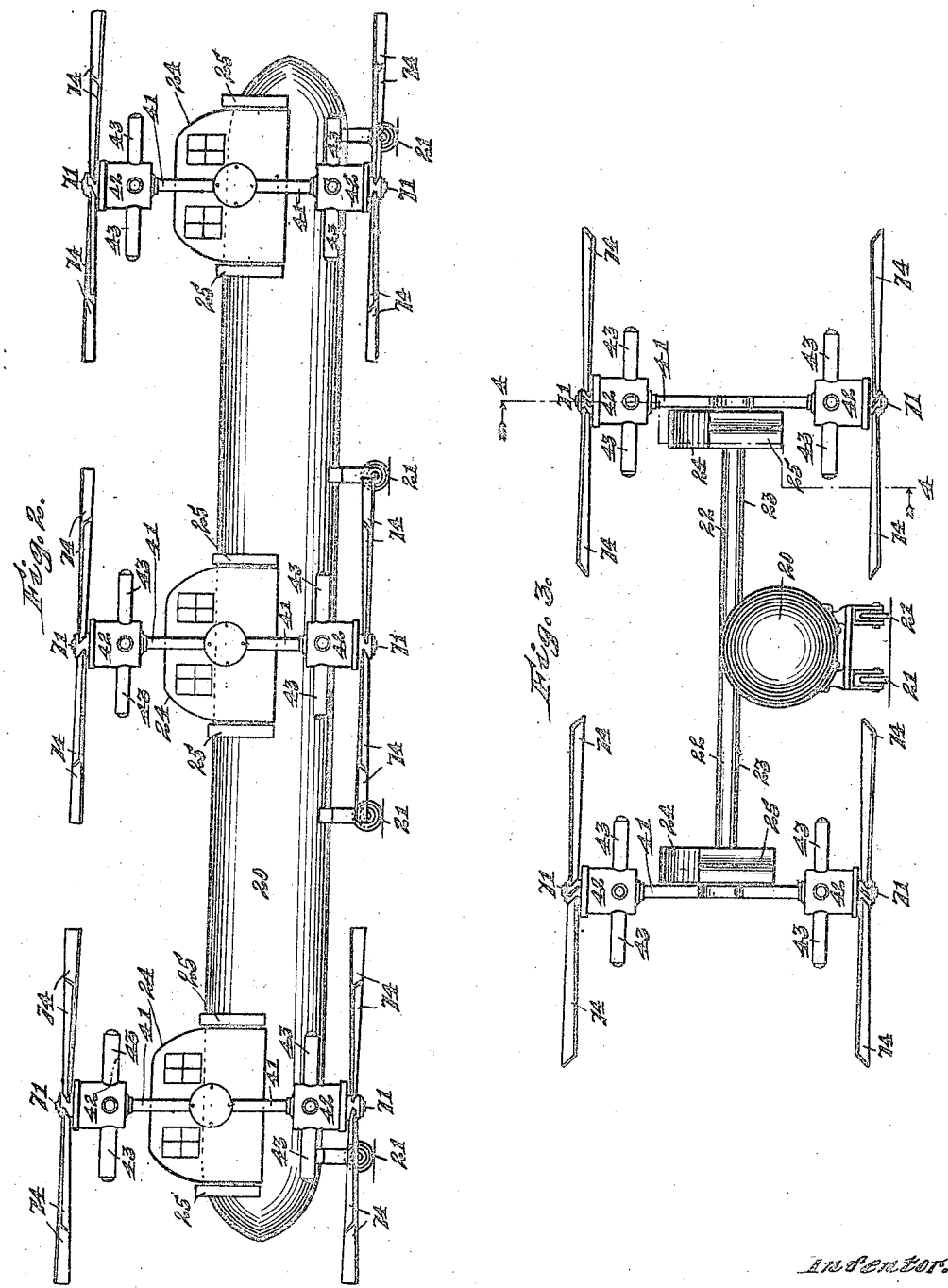

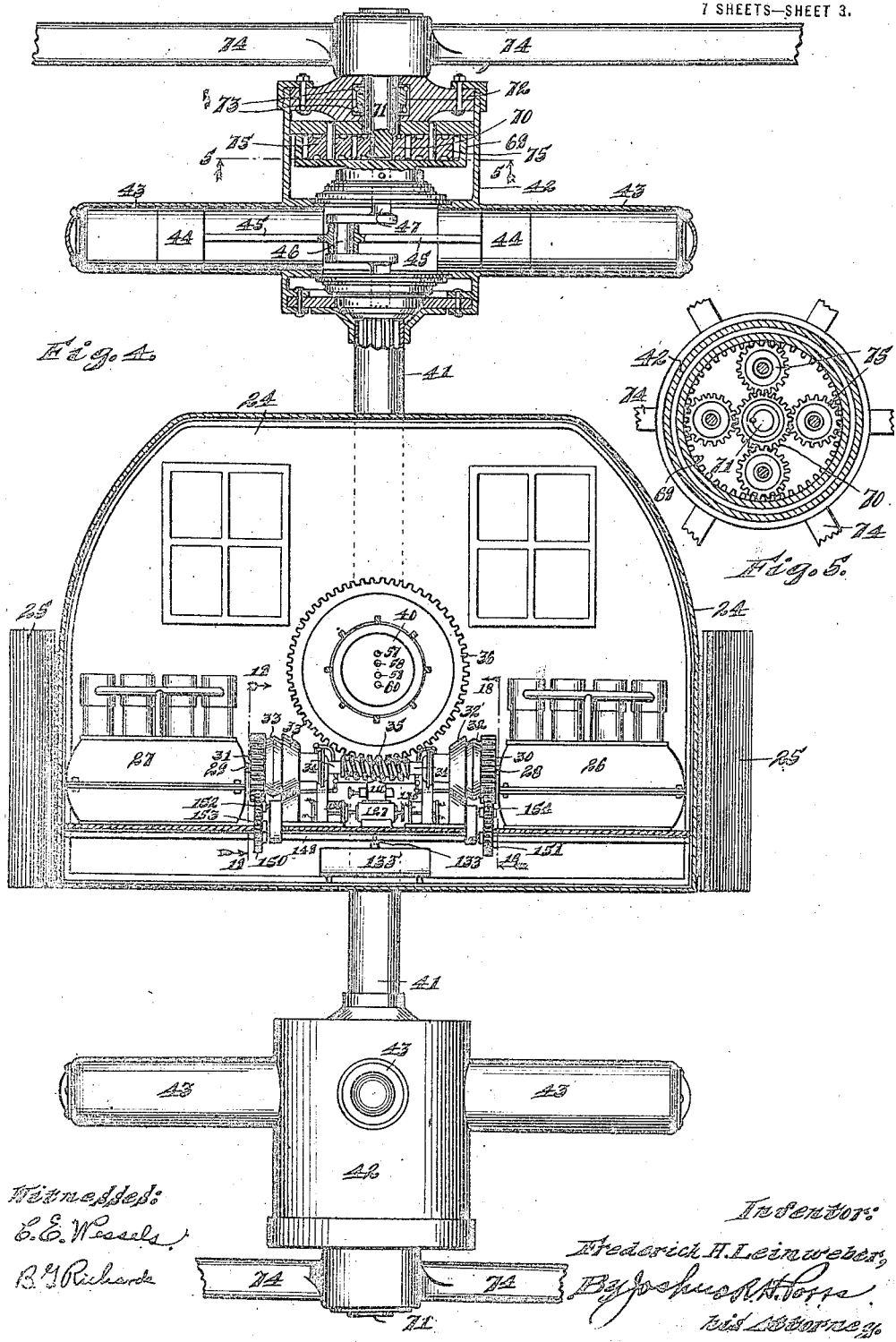

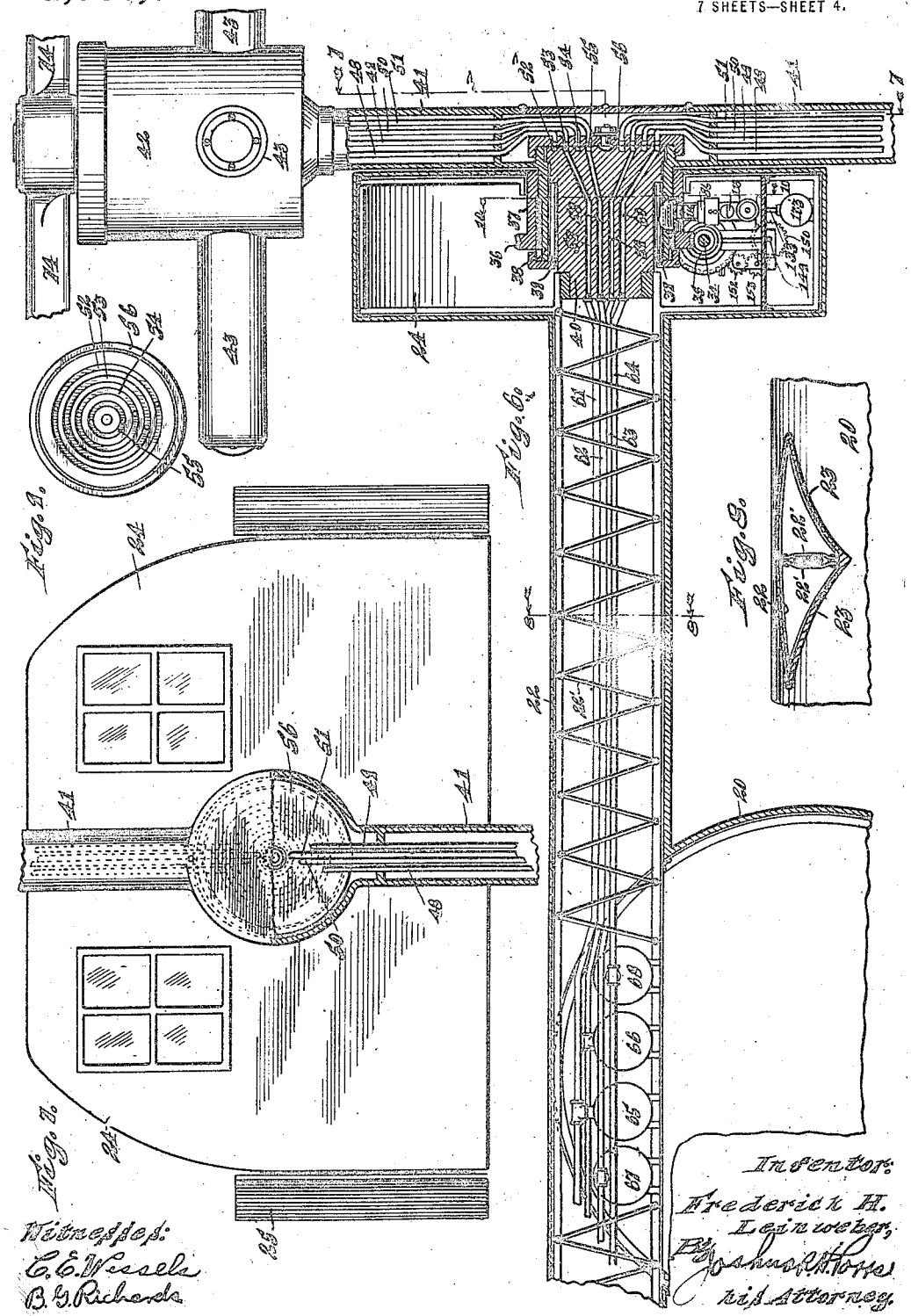

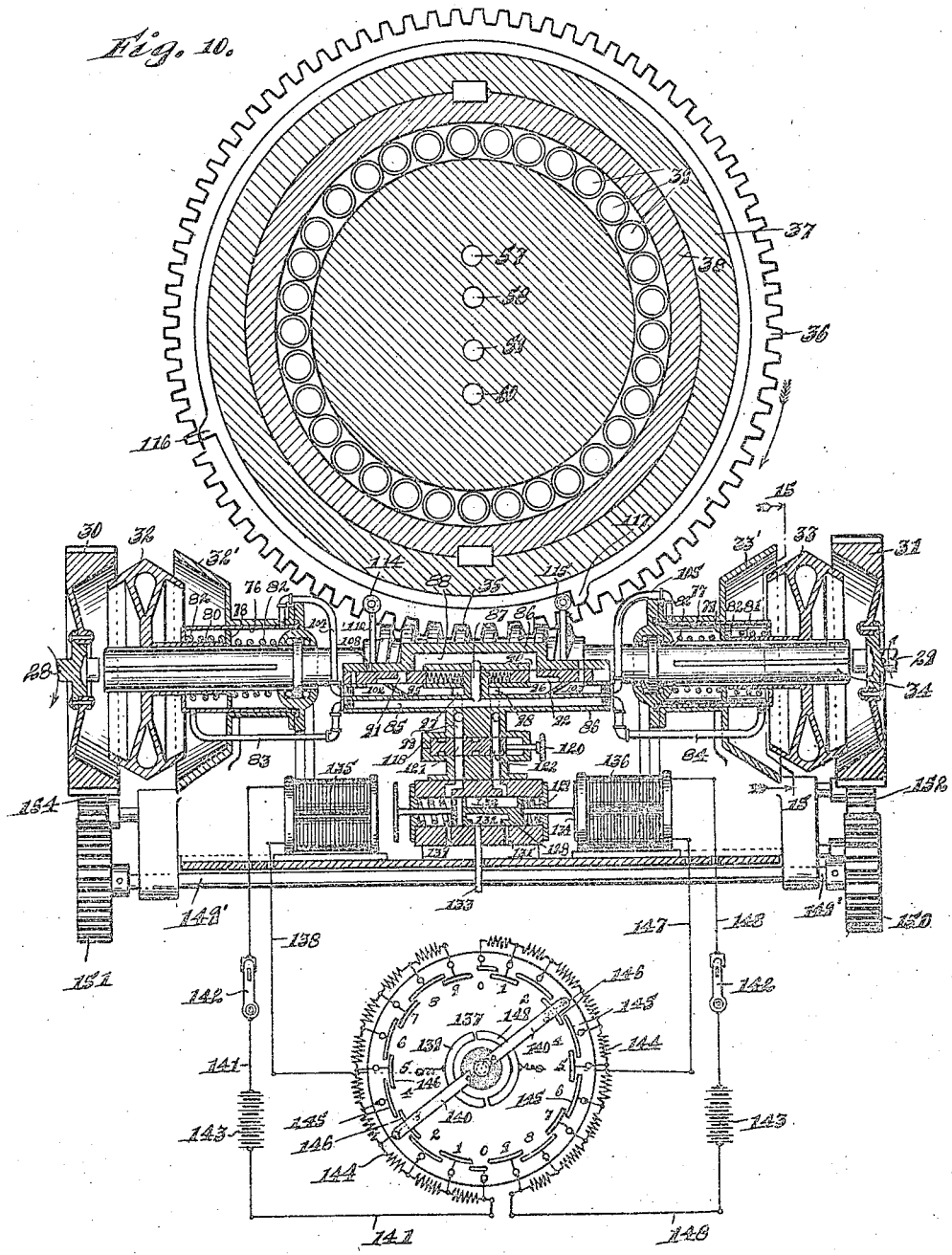

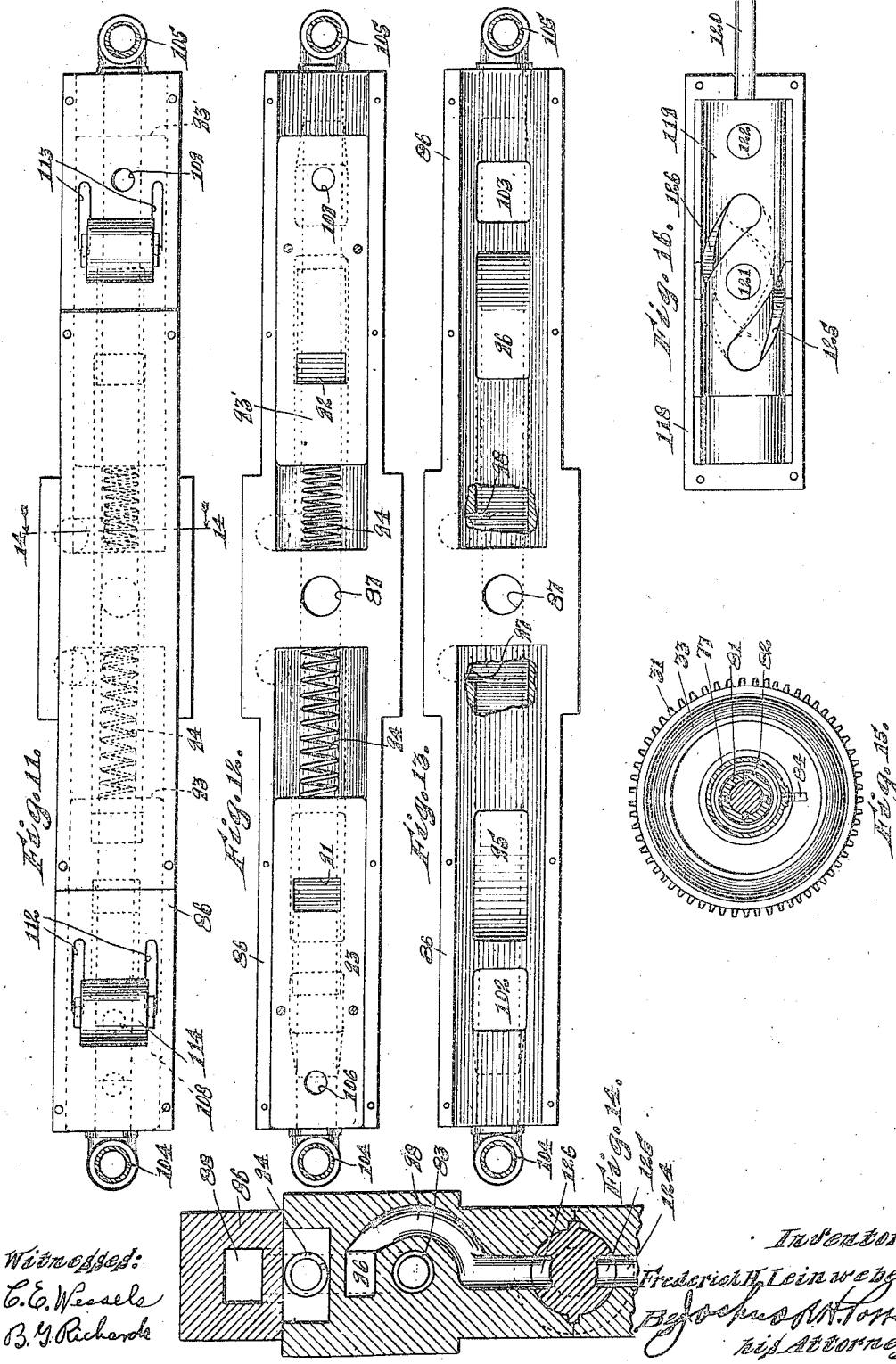

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER, EXECUTORS OF SAID FREDERICK H. LEINWEBER, DECEASED.

AIRSHIP.

1,386,713.   Specification of Letters Patent.   Patented Aug. 9, 1921.

Application filed November 27, 1916, Serial No. 133,754. Renewed April 30, 1920. Serial No. 378,016.

*To all whom it may concern:*

Be it known that I, FREDERICK H. LEINWEBER, a citizen of the United States, and a resident of the city of Chicago, county of Cook, and State of Illinois, have invented certain new and useful Improvements in Airships, of which the following is a specification.

My invention relates to improvements in airships and has for its object the provision of an improved construction of this character which is simple and efficient in operation.

A further object is the provision of an airship equipped with means adapted to automatically render the same safe for travel in the air and prevent unintentional descent thereof.

A further object is to provide improved means for operating the propellers of such an air ship.

Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of an airship, embodying my invention, Fig. 2, a side view of the same, Fig. 3, an end view of the same, Fig. 4, an enlarged section taken on substantially line 4—4 of Fig. 3, Fig. 5, a detail view taken on line 5—5 of Fig. 4, Fig. 6, an enlarged section taken on line 6—6 of Fig. 1, Fig. 7, a detail section taken on substantially line 7—7 of Fig. 6, Fig. 8, a section taken on line 8—8 of Fig. 6, Fig. 9, a detail view of a closure cap or plate employed in the construction, Fig. 10, a section taken on line 10—10 of Fig. 6, Fig. 11, an enlarged top plan view of a valve employed in the construction, Fig. 12, a similar view of said valve with parts removed, Fig. 13, a similar view of said valve with still further parts removed.

Fig. 14, a section taken on line 14—14 of Fig. 11,

Fig. 15, a section taken on line 15—15 of Fig. 10,

Fig. 16, a detail view of one of a plurality of manually operative valves employed in the construction, Fig. 17, an enlarged detail section of one of the valve mechanisms employed in the construction, Fig. 18, an enlarged section taken substantially on line 18—18 of Fig. 4, and Fig. 19, an enlarged section taken on line 19—19 of Fig. 4.

The preferred form of construction as illustrated in the drawings comprises a substantially cigar-shaped car or carriage 20 mounted to rest or travel upon traction wheels 21 and equipped with laterally extending tubular supports or carriers 22, all constituting the frame of the airship. Each of the supports 22 is provided with sloping under surfaces 23 adapted to act as elevating planes when the airship is driven forwardly or backwardly, as will be readily understood. Each of the supports 22 is made hollow and of sufficient size to permit of the passage of a human being therethrough and is reinforced and stiffened centrally by truss work 22'. At its outer end each of the supports 22 carries an operator's housing or casing 24 having substantially V-shaped shields 25 at its forward and rearward sides to facilitate the passage thereof through the air. Internal combustion engine units 26 and 27 are positioned in each of the housings 24 with their engine shafts 28 and 29 in longitudinal alinement with each other. Gear fly wheels 30 and 31 are fixed respectively on the shafts 28 and 29 and are provided with friction clutch surfaces arranged to engage friction clutch members 32 and 33, which are splined or feathered on a shaft 34 arranged between the engine shafts 28 and 29 coaxially therewith. Shaft 34 carries a worm 35 meshing with a corresponding worm wheel 36 on a sleeve or hub 37 keyed to another sleeve or hub 38 which is rotatably mounted in the corresponding housing 24 to project centrally through the outer wall thereof. Each of the hubs 38 is mounted upon roller bearings 39 on a supporting head 40 and radiating hollow propeller supporting arms 41 are formed integrally with the outer portion of each of the hubs 3 as shown. Each of the arms 41 carries at its outer end an engine crank case 42 and four internal combustion engine cylinders 43 are mounted on each of said crank cases in diametrically arranged pairs, as shown. Each of the engine cylinders 43 is equipped with a suitable piston 44 connected by a connecting rod 45 with a crank pin 46 of a crank shaft 47 mounted in the corresponding crank case.

Fuel supply pipes 48, 49, 50 and 51 extend through each of the arms 41 to the respective engine cylinders thereon for supplying fuel thereto, said pipes being connected respectively at their inner ends with annular fuel channels or grooves 52, 53, 54 and 55 formed in the inner face of a closure cap 56 threaded over the outer end of the corresponding hub 36 as best shown in Figs. 6 and 9. Each of the supporting heads 40 is provided with fuel grooves corresponding and registering with the grooves 52, 53, 54 and 55 and fuel passages 57, 58, 59 and 60 are extended through said head to communicate with said grooves. Likewise fuel supply pipes 61, 62, 63 and 64 connect the passages 57, 58, 59 and 60 respectively with fuel supply tanks 65, 66, 67 and 68 located in the upper portion of the car 20. By this arrangement it will be observed that the arms 41 may be readily adjusted to different angular positions with reference to the horizontal and that different kinds or grades of fuel may be readily supplied to the different engine cylinders.

An internal gear 69 is fixed to the outer end of each of the crank shafts 47 surrounding a spur gear 70 fixed to the inner end of a propeller shaft 71 supported in the outer end 72 of the corresponding crank case 42. For this purpose the outer ends of the crank case 42 are split or divided as shown and thrust ball bearings 73 arranged therein to resist the thrust of the propeller blades 78 on the corresponding propeller shaft 71. Each of the internal gears 69 is connected with the corresponding spur gear 70 by means of transmission gears 75 mounted as indicated and arranged in diametrically opposed pairs about said spur gear. By this arrangement it will be observed that each propeller will be driven at a speed greater than the speed of the corresponding crank shaft 47, that the transmission stresses and strains will be evenly distributed and balanced and that the thrust of the propeller blades will be transmitted directly to the corresponding crank case and thence to the corresponding arm 41 thus relieving the corresponding engines constructions from all of such strains.

As best shown in Fig. 10, cylinders 76 and 77 are arranged about the opposite ends of each of the shafts 34 and pistons 78 and 79 formed at the inner ends of sleeves 80 and 81 on the friction clutch members 32 and 33, respectively, operate in said cylinders. Compression springs 82 are interposed between these pistons at each end of the corresponding cylinders to normally maintain the clutch members 32 and 33 in central or neutral positions. Air supply pipes 83 and 84 lead from the outer ends of the cylinders 76 and 77 to an air supply passage 85 in a valve casing 86 positioned centrally with reference to the corresponding shaft 34. A vertical passage 87 leads from the central portion of passage 85 and communicates at its upper end with a transverse passage 88 having ports 89 and 90 at its opposite ends as best shown in Fig. 17. Ports 89 and 90 coöperate with substantially L-shaped ports 91 and 92 in slide valves 93 and 93' arranged in casing 86 and normally held in outward positions, by means of compression springs 94. Passages 95 and 96 are formed in valve casing 86 under valves 93 and 93' and are connected by bowed passages 97 and 98 with vertical passages 99 and 100 in the central stem portion 101 of the valve casing. Passages 102 and 103 are formed in valve casing 86 outside of passages 95 and 96, and air pipes 104 and 105 lead therefrom to the inner ends of the corresponding cylinders 76 and 77 as shown. Exhaust ports 106 and 107 are arranged in valves 93 and 93' to coöperate with exhaust ports 108 and 109 in valve casing 86 to exhaust passages 102 and 103 and the inner ends of the corresponding cylinders 76 and 77. Valves 93 and 93' carry upstanding brackets 110 and 111 operating through slots 112 and 113 in the top of the valve casing 86, as best shown in Figs. 17 and 11. Brackets 110 and 111 carry rollers 114 and 115 set in the path of stop lugs 116 and 117 formed on the side of the corresponding worm wheel 36. The arrangement is such that after each of the worm wheels 36 performs a certain part of its revolution, the corresponding valve 93 or 93' is shifted to simultaneously exhaust the inner end of the cylinder 76 or 77 and to supply air under pressure to the outer ends of said cylinders from passages 99 and 100 which are air supply passages, as will be explained more fully hereinafter. This serves to automaticaly shift the friction clutch members 32 and 33 inwardly to engage stationary braking friction members 32' and 33' to stop further movement of the corresponding worm wheel. As indicated above, revolution of each of the worm wheels 36 serves to adjust the corresponding propellers 74 to vary the direction of thrust. The arrangement is such and the stops 116 and 117 are so positioned that when the propellers are shifted from positions in which they exert a vertical thrust to positions in which they exert a combined vertical and horizontal thrust, when the vertical resultant of the thrust of the propellers becomes just sufficient to maintain the airship at the altitude reached, the valve 93 or 93' is shifted to prevent further movement and said valve is automatically locked in this position.

Likewise when the propellers are reversely shifted, when they assume a position to exert a vertical thrust, they are again automatically locked in such position.

A valve casing 118 is formed in the stem portion 101 of the valve casing 86 and a manually operable valve 119 is slidably mounted therein and equipped with an operating wheel 120, as best shown in Fig. 17. As best shown in Figs. 17 and 16, the valve 119 is provided with two diametric ports 121 and 122 arranged to connect the passages 99 and 100 with passages 123 and 124 respectively, the valve 119 when in this position being neutral and ineffective. The valve 119 is also provided with two helical ports 125 and 126 arranged to be shifted to connect passage 99 with passage 124 and passage 100 with passage 123. Passages 123 and 124 are employed for supplying compressed air to or exhausting passages 95 and 96, as will appear more fully hereinafter.

The arrangement is such that when the automatically operating valve more fully hereinafter set forth is disconnected and rendered ineffective, each propeller may be manually controlled by valve 119, as will be readily understood, or the valve may be shifted to neutral position where it becomes entirely ineffective.

Another valve casing 127 is arranged at the lower end of the stem 101 and contains a slide valve 128 normally held in neutral or central position by means of compression springs 129, as best shown in Fig. 17. At one side valve 128 is provided with a passage 130 arranged to connect passage 123 with an exhaust port 131 when the valve 128 is shifted into one position and the other side of the valve 128 is so shaped as to place passage 124 in communication with an exhaust port 131' when said valve is shifted into its opposite position. The valve 128 is provided with a central compressed air supply passage or chamber 132 receiving a constant supply of compressed air through a pipe 133 connected with a compressed air tank 133', as best shown in Figs. 4 and 17.

Valve 128 which is provided with laterally extending stems carries armatures 134 coöperating with electro-magnets 135 and 136, as shown. An aneroid barometer 137 of any usual design or construction is arranged to coöperate with valve 128, as best shown in Fig. 10. Electro-magnet 135 is connected by one wire 138 with an insulated segmental plate 139 contacting with one arm 140 of the ordinary indicator finger of the aneroid barometer. Electro-magnet 135 is also connected by a wire 141 through a switch 142 and a battery 143 with one end of a series of resistance coils 144 connected at intervals with bridging contacts 145 and 146, as shown. Likewise, the electro-magnet 136 is similarly connected by wires 147 and 148 with a segmental contact plate 149 and with a similar series of resistance coils 144. The arrangement is such that as the airship rises to higher altitudes, the indicator finger 140 thereof will be rotated in the usual manner to cause the ends thereof to traverse the different contacts 145 and 146. The effect of this action of the indicator finger 140 is to gradually introduce resistance into the circuit for electro-magnet 135 and cut out resistance from the circuit for electro-magnet 136, as will be readily understood. The tension of the springs 129 is such that when the airship reaches a predetermined altitude, the valve 128 will be shifted by this action of the electro-magnets to cause introduction of air into the inner end of the cylinder 77 and exhaust of the outer ends of cylinders 76 and 77, thus causing friction clutch member 33 to shift into engagement with the gear fly wheel 31. The engines 26 and 27 are constantly operated to cause rotation of the gear fly wheels 30 and 31 in the directions of the arrows indicated in Fig. 10, so that engagement of the member 33 with the member 31 causes rotation of the worm wheel 36 in the direction of the arrow indicated in Fig. 10. When the lug 117 contacts with the roller 115 the valve 93' is shifted to the position indicated in Figs. 10 and 17, thus exhausting the inner end of cylinder 77 and supplying compressed air to the outer ends of both of the cylinders 76 and 77, forcing the friction clutch members 32 and 33 inwardly to engage with the corresponding stationary friction members 32' and 33' to automatically lock the parts in this relation, Fig. 10 showing the friction clutch members in the middle of their movement. In case the airship should descend, the indicator arm 140 will be caused to rotate through the decrease in altitude, thus cutting out resistance from magnet 135 and cutting in resistance for magnet 136, so that the springs 129 overcome the magnets and return the valve 128 to initial position in which compressed air will be furnished to the inner end of cylinder 76 and the outer end thereof exhausted thus shifting clutch member 32 into engagement with member 30 and starting the movement of worm wheel 36. When worm wheel 36 has moved sufficiently to set the propellers in position to exert only a vertical thrust, the valve 93 is automatically shifted to exhaust the inner end of cylinder 76 and supply compressed air to the outer ends of both the cylinders 76 and 77, thus discontinuing the motion of the worm wheel 36 and the propellers and automatically locking the parts in place. When the predetermined altitude has been again attained, the indicator finger 140 again operates, as outlined above, to discontinue the elevation and cause horizontal travel of the ship. In this manner the ship will be automatically prevented from departing materially from the predetermined altitude.

If desired at any time, the switches 142 may be opened, thus discontinuing the automatic regulation as to altitude and the various propellers manually operated by manipulating the wheel 120.

The gear fly wheels 30 and 31 in each set are operatively connected by means of a counter-shaft 149' carrying gears 150 and 151. Gear 150 is connected with gear 31 by means of idlers 152 and 153, and gear 151 is connected with gear 30 by means of an idler 154, the arrangement being such that the gears and their coöperating parts will be forced to operate in unison with each other, and upon failure of either of the engines 26 or 27 the other engine will perform the work of both and also tend to start the operation of the disabled one. The direction of the travel of the airship is reversed by shifting valve 119 to the position indicated in Fig. 17.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An air ship comprising a frame; propellers adjustable on said frame; clutches connected to adjust said propellers; pneumatics for operating said clutches; and altitude operable means for operating said pneumatics, substantially as described.

2. An airship comprising a frame; propellers adjustable on said frame; clutches connected to adjust said propellers; pneumatics for operating said clutches; valves controlling said pneumatics; and altitude operable means for operating said valves, substantially as described.

3. An airship comprising a frame; propellers adjustable on said frame; clutches connected to adjust said propellers; pneumatics for operating said clutches; valves controlling said pneumatics; electromagnets controlling said valves; and altitude operable means for operating said magnets, substantially as described.

4. An air ship comprising a frame; propellers adjustable on said frame; clutches connected to adjust said propellers; pneumatics for operating said clutches; and means for automatically disconnecting said clutches after a predetermined operation, substantially as described.

5. An airship comprising a frame; propellers adjustable on said frame; clutches connected to adjust said propellers; pneumatics for operating said clutches; valves controlling said pneumatics; and means for automatically disconnecting said clutches after a predetermined operation, substantially as described.

6. An airship comprising a frame; propellers adjustable on said frame; clutches connected to adjust said propellers; pneumatics for operating said clutches; valves controlling said pneumatics; electromagnets controlling said valves; and means for automatically disconnecting said clutches after a predetermined operation, substantially as described.

7. An airship comprising a frame; propellers adjustable on said frame; clutches connected to adjust said propellers; pneumatics for operating said clutches; and means for automatically locking said propellers in adjusted positions, substantially as described.

8. An airship comprising a frame; propellers adjustable on said frame; clutches connected to adjust said propellers; pneumatics for operating said clutches; valves controlling said pneumatics; and means for automatically locking said propellers in adjusted positions, substantially as described.

9. An airship comprising a frame; propellers adjustable on said frame; clutches connected to adjust said propellers; pneumatics for operating said clutches; valves controlling said pneumatics; electromagnets controlling said valves; and means for automatically locking said propellers in adjusted positions, substantially as described.

10. An airship comprising a frame; propellers adjustable on said frame; adjusting devices connected to adjust said propellers; means for operating said adjusting devices and means for automatically locking said propellers in adjusted positions, substantially as described.

11. An airship comprising a frame; propellers adjustable on said frame; adjusting devices connected to adjust said propellers; means for operating said adjusting devices; valves controlling said means; and means for automatically locking said propellers in adjusted positions, substantially as described.

12. An airship comprising a frame; propellers adjustable on said frame; adjusting devices connected to adjust said propellers; means for operating said adjusting devices; valves controlling said means; electromagnets controlling said valves; and means for automatically locking said propellers in adjusted positions, substantially as described.

13. An airship comprising a frame; adjustable propelling means on said frame; altitude operable means for adjusting said propelling means; and automatic means for locking said propelling means in adjusted positions, substantially as described.

14. An airship comprising a frame; vertically thrusting propelling means adjustable on said frame; altitude operable means arranged to adjust said propelling means at a predetermined altitude to exert a horizontal thrust; and automatic means for locking said propelling means in adjusted positions, substantially as described.

15. An airship comprising a frame; adjustable propellers on said frame; driving means for said propellers adjustable therewith; altitude operable means for adjusting said propellers; and automatic means for locking said propellers in adjusted positions, substantially as described.

16. An airship comprising a frame, propellers adjustable on said frame, adjusting devices connected to adjust said propellers, means for operating said adjusting devices, and altitude operable means for operating said adjusting device operating means.

17. An airship comprising a frame, vertically thrusting propellers adjustable on said frame, adjusting devices connected to adjust said propellers, means for operating said adjusting devices, and altitude operable means arranged to operate said adjusting device operating means at a predetermined altitude to exert a horizontal thrust, substantially as described.

18. An airship comprising a frame, propellers adjustable on said frame, mechanism for adjusting said propellers with relation to said frame, and altitude operable means for operating said propeller adjusting mechanism, substantially as described.

19. In an airship the combination of a car, supports extending laterally from said car, said supports forming airplanes, an arm pivotally mounted on each end of said support, a propeller at each end of each of said arms, and means for operating said propellers substantially as described.

20. In an airship the combination of a car, airplane shaped supports extending laterally from said car, said supports forming airplanes when the car is driven forwardly or backwardly, an arm pivotally mounted on each end of said support, a propeller at each end of each of said arms, and means traversing said supports for operating said propellers, substantially as described.

In testimony whereof I have signed my name to this specification in the presence of two subscribing witnesses.

FREDERICK H. LEINWEBER.

Witnesses:
JOSHUA R. H. POTTS,
B. G. RICHARDS.